United States Patent [19]
Ikeuchi et al.

[11] Patent Number: 4,919,957
[45] Date of Patent: * Apr. 24, 1990

[54] METHOD FOR MAKING SHRIMP-SHAPED FOOD PRODUCTS

[75] Inventors: Horoji Ikeuchi; Kiyoaki Ikeuchi, both of Akashi, Japan

[73] Assignee: Kabushiki Kaisha Ikeuchi Tekkosho, Akashi, Japan

[*] Notice: The portion of the term of this patent subsequent to May 31, 2005 has been disclaimed.

[21] Appl. No.: 190,369

[22] Filed: May 5, 1988

Related U.S. Application Data

[63] Continuation-in-part of Ser. No. 75,575, Jul. 20, 1987, Pat. No. 4,748,039.

[30] Foreign Application Priority Data

Jan. 22, 1987 [JP] Japan ................................ 62-13104
May 6, 1987 [JP] Japan ................................ 62-111519

[51] Int. Cl.⁵ .......................... A23L 1/325; A23P 1/00
[52] U.S. Cl. ...................................... 426/513; 426/643
[58] Field of Search ................ 426/513, 643, 393; 425/542

[56] References Cited

U.S. PATENT DOCUMENTS 3,780,196 12/1973 Domecki ............................. 426/393
4,396,634 8/1983 Shenouda et al. .................. 426/513
4,692,341 9/1987 Ikeuchi et al. ...................... 426/643
4,720,391 1/1988 Kawana .............................. 426/643
4,748,039 5/1988 Ikeuchi et al. ...................... 426/643

FOREIGN PATENT DOCUMENTS 0239203 9/1987 European Pat. Off. .
62-69967 3/1987 Japan .

*Primary Examiner*—George Yeung
*Attorney, Agent, or Firm*—Marshall, O'Toole, Gerstein, Murray & Bicknell

[57] ABSTRACT

Apparatus for producing shrimp-shaped food products and a food product produced by the apparatus. The apparatus includes a split mold having a cavity shaped as a shelled-shrimp-shaped product. The mold has an injection opening for injecting a minced fish material into the cavity, the injection opening extending from the root or base of the shrimp's head to the shrimp's back portion and being oriented upwardly. After injecting the minced fish meat into the cavity, a V-shaped device is lowered towards the opening of the mold to make a longitudinal groove in the minced fish material. The mold and the material are heated up to produce a shrimp-shaped food product. The apparatus may further include a cover mold having a supply channel formed in it for moving the material to the injection opening. The V-shaped device may be incorporated in the cover mold.

4 Claims, 3 Drawing Sheets

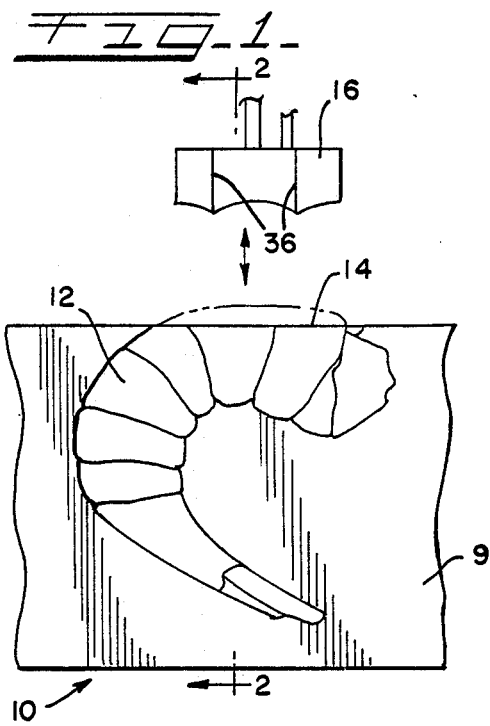
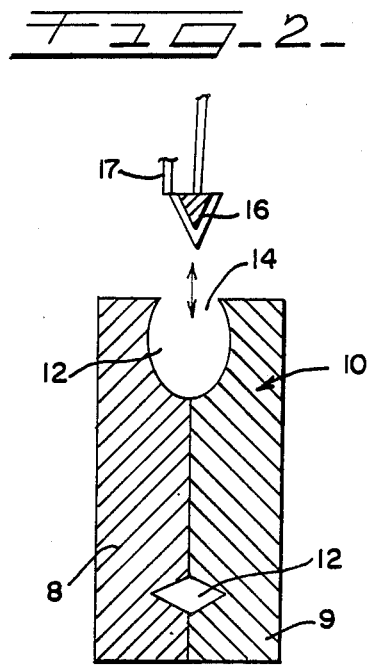
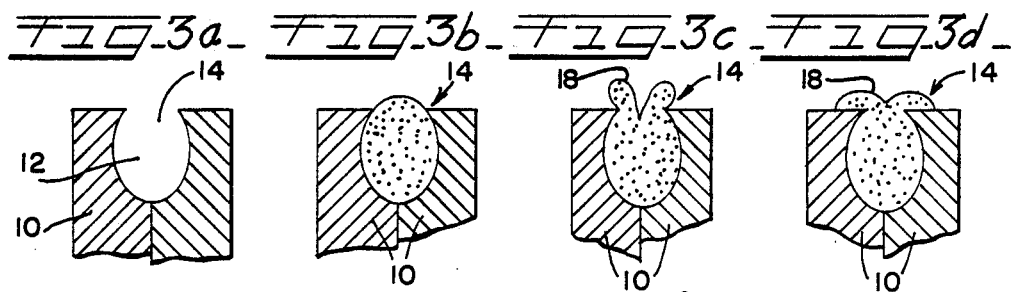
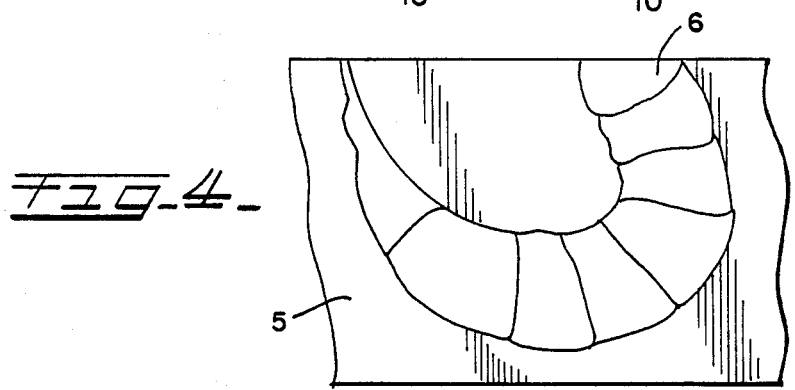
PRIOR ART

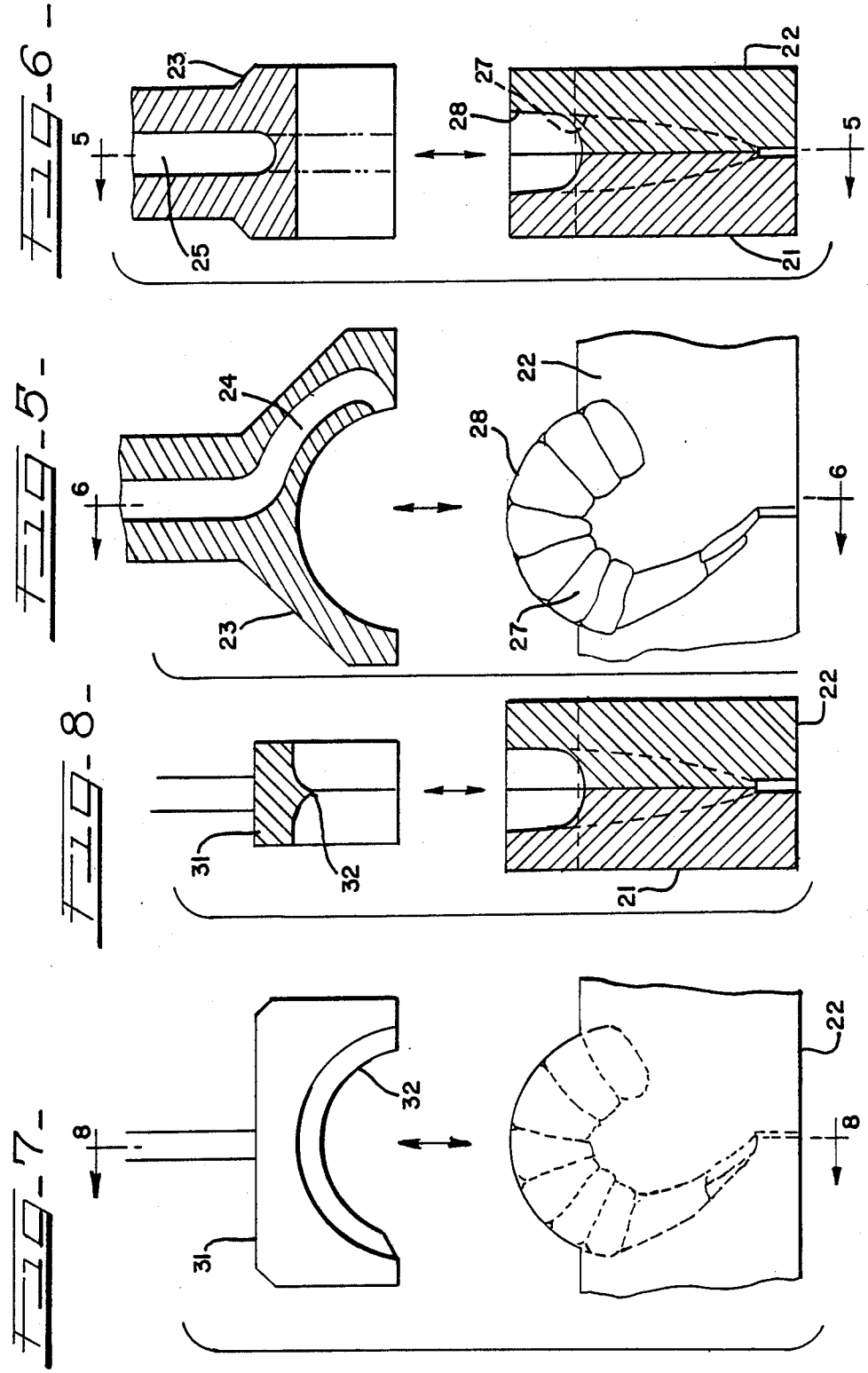

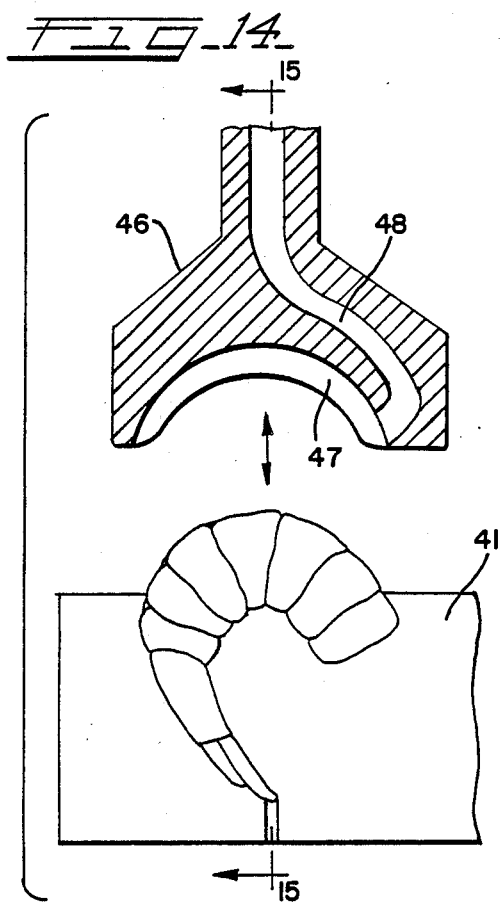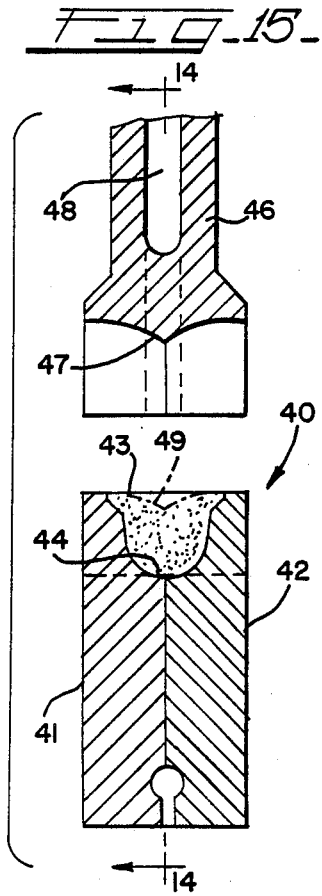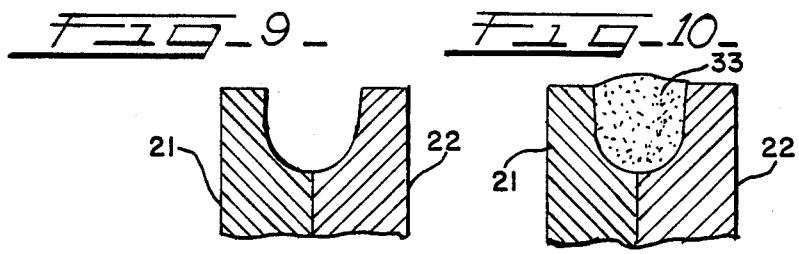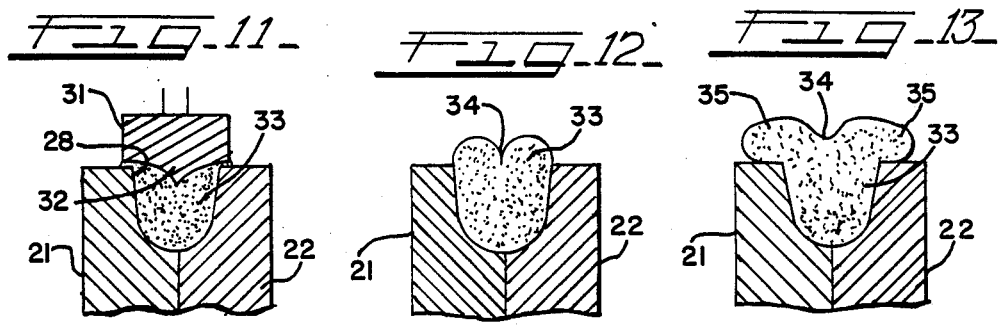

METHOD FOR MAKING SHRIMP-SHAPED FOOD PRODUCTS

RELATED APPLICATIONS

This application is a continuation-in-part of pending application Ser. No. 075,575 filed Jul. 20, 1987, now U.S. Pat. No. 4,748,039.

FIELD AND BACKGROUND OF THE INVENTION

The present invention relates to apparatus for producing a food product and to a food product made from minced fish meat and the like, having the appearance of cooked-and-peeled shrimp.

Apparatus for producing food products having the appearance of cooked-and-peeled shrimp from minced fish meat are disclosed in the applicants' U.S. Pat. applications Ser. No. 818,618, now U.S. Pat. No. 4,692,341, and Ser. No. 879,984, and in Japanese patent application 60-211805 (Provisional Publication SHO. 62-69967, laid open Mar. 31, 1987). These U.S. applications, the disclosures therein being incorporated into this application by reference, disclose apparatus including a split-in-two metal mold having a cavity in the shape of a cooked-and-peeled or shelled shrimp, a device for spraying a dye over the inner surface of the mold, a filler for injecting minced fish meat into the mold cavity, a heating device for heating and solidifying the minced fish meat in the mold, and a device for removing the food product from the mold. The shrimp-like food product thus produced has a fan-like tail at one end, an arcuate abdomen portion in the center, and a thicker end which, in a real shrimp, is broken off from the head. As shown in FIG. 4 herein, the mold cavity of a split mold 5 for forming the shelled-shrimp-like food product has its fish meat receiving opening 6 at the thicker end where the removed head is connected.

The food product consists of a main ingredient of ground fish meat to which flavoring and a caking agent are added.

The shelled-shrimp-shaped food products produced by the above-mentioned apparatus have the appearance of the natural or real products. When the natural shrimps are large in size, their gut portion extending from the head to the tail is removed during the cooking-and-peeling process (the intestinal vein is removed in a deveining procedure). The resulting groove does not become colored even after heating, and both ridges or sides of the groove swell after heating. If the simulated food product were formed in this shape by the mold, the product could not be removed out of the mold. If the mold were shaped so that the product can be removed from the mold, the resulting food would not have a natural appearance.

SUMMARY OF THE INVENTION

One aspect of this invention is the provision of a shrimp-shaped processed food product which more closely resembles the appearance of a real shrimp. Ground fish meat to which flavoring and a caking agent are added is injected into a mold, heated and solidified. The shrimp-shaped food product has a continuous groove running along the back of the torso, and both sides of this groove has enlarged parts, similar to the appearance of a real shrimp which has been deveined and cooked.

The present invention further provides apparatus for producing such shrimp-shaped food products from minced fish meat by injecting minced fish meat material into a split-in-two mold having a cavity shaped as a shelled-shrimp-shaped product, and then heating the minced fish meat material together with the mold to produce a shrimp-shaped food product. The mold has an injection opening for injecting the minced fish material into the cavity, the injection opening extending from the root or base of the shrimp's head to the shrimp's back portion and being oriented upwardly, whereby after injecting the minced fish meat into the cavity, a V-shaped device which can be freely moved in the vertical direction is lowered towards the opening of the mold to make a longitudinal groove in the minced fish material, and then the mold is heated up to produce a shrimp-shaped food product.

In another aspect of the invention, there is further provided cover mold for the supply opening of the cavity which receives the raw material and which seals off the opening of the cavity. The shape of the cover mold matches the external shape of the back of a shrimp. The cover mold is lowered over the supply opening in the mold in order to seal off the opening and a raw material consisting of a main ingredient of ground fish meat to which flavor and a caking agent have been added is injected into the cavity. After the cavity is filled with the raw material, the cover mold is moved away and a compression tool having a wedge-shaped cross section is pressed down onto the top of the raw material so that it forms a groove in the raw material in the opening, and then the mold is heated in order to form the shape of the raw material.

In still another aspect of the invention there is provided two mold halves having a cavity formed in the shape of the shelled meat of a shrimp and a cover mold for the supply of the raw material, the cover mold being shaped with a wedge-shaped cross section and being joined to the mold halves in order to seal off the cavity. A raw material consisting of a main ingredient of ground fish meat to which flavor and a caking agent have been added is injected through the cover mold into the cavity in the mold halves. After the cavity is filled with the raw material the cover mold may or may not be moved and then the mold is heated in order to form the shape of the raw material.

BRIEF DESCRIPTION OF THE DRAWINGS

The present invention will be better understood from the following detailed description of preferred embodiments, taken in conjunction with the accompanying drawing, wherein:

FIG. 1 is a front view of the inner side of one section of a split mold in accordance with one embodiment of this invention;

FIG. 2 is a sectional view along the line 2—2 of FIG. 1;

FIGS. 3a, 3b, 3c and 3d are fragmentary views of a portion of FIG. 2, showing steps in molding a food product;

FIG. 4 is a view of a prior art section of a split mold;

FIG. 5 is a vertical cross-sectional view taken along the line 5—5 of FIG. 6 showing apparatus in accordance with a second embodiment of this invention;

FIG. 6 is a cross-sectional view taken along the line 6—6 of FIG. 5;

FIG. 7 is a side view of a split mold and compression tool in accordance with the second embodiment of this invention;

FIG. 8 is a cross-sectional view taken along the line 8—8 of FIG. 7;

FIGS. 9 to 13 show the various steps in a process of producing a food product using the apparatus shown in FIGS. 5 to 8;

FIG. 14 is a cross-sectional view taken along the line 14—14 in FIG. 15 showing apparatus in accordance with a third embodiment of this invention;

FIG. 15 is a cross-sectional view taken along the line 15—15 in FIG. 14.

DETAILED DESCRIPTION OF THE DRAWINGS

With reference first to FIGS. 1 and 2, the mold 10 includes two halves or sections 8 and 9 which have a mold cavity 12 between them for molding a cooked-and-peeled-shrimp-shaped food product. When the mold halves 8 and 9 are mated together, they form a closed cavity resembling the shape of a shelled shrimp. The cavity 12 is shaped and positioned so that the portion between the shrimp's head and the middle of its back is located in an injection opening 14 formed in the top of the mold.

Above the mold 10 is a vertically movable V-sectioned device 16 which is in the shape of a wedge and is located above the joint of the mold 10 and the opening 14, and the device 16 may be lowered down to the level of the opening 14 of the mold 10. The device 16 may have wave-shaped or scalloped surfaces as shown in FIG. 1 to resemble the nodes of the natural cooked-and-peeled shrimp. It will be convenient to arrange the device 16 with a water supply tube 17 adjacent it so that water oozes out and across the device 16 to keep the lower wedge surface wet. This prevents the minced fish meat material from sticking to the device 16 when a groove is pressed into the paste-like material.

FIGS. 3a to 3d illustrate the steps in the production process. FIG. 3a shows the process prior to injection of the minced fish material into the mold; the desired coloring or dye is preferably applied over the internal surface of the cavity 12 before the injection of the minced fish meat material, as described in the previously mentioned patent applications. FIG. 3b shows the state upon the completion of injection of the minced fish meat material. The material swells over the top of the opening of the mold 10. FIG. 3c shows the state after lowering the V-sectioned device 16 onto the meat material and then raising it from the top of the opening 14, thereby forming a groove 18 in the material at the opening 14. FIG. 3d shows the state after heating the mold 10 filled with the material to solidify the minced fish meat material. The solidified food product protrudes extensively over the flat upper surface of the mold. Then, the product can be removed from the mold 10. The product has a groove extending from the shrimp head to the middle of the back, with both ridges of the groove having a swelled appearance. Thus its appearance closely resembles that of cooked natural shrimp.

Thus, in accordance with the invention, the apparatus produces shelled-shrimp-like food products by injecting minced fish meat into a split-in-two metal mold having a cavity for molding a shelled-shrimp-like food product, and heating the minced fish meat material together with the mold. The mold has the opening for injecting the minced fish meat into the mold cavity at the portion corresponding to the portion between the shrimp's head and the middle of its back, and the opening is oriented upwardly. As a result, when the minced fish meat is injected into the opening, the minced fish meat swells out of the opening after injection. When the V-section device is lowered into the swelled portion to impress a longitudinal groove in the back of the product and after the device is raised, a groove is formed in the swelled minced meat material at the opening. Then, when the minced fish meat is heated together with the mold to solidify the meat, the swelled portion at the opening will increase its irregularity in shape, thus closely resembling the swell of the natural gutted, cooked and shelled shrimp. The finished heated and solidified food product is then removed from the mold. The swell of the ridges of the back portion varies from product to product. The appearance of the product thus has a closer resemblance to that of cooked natural shrimp, thereby assuring a higher market value.

FIGS. 5 and 6 show a split mold including halves 21 and 22 and a cover mold 23 containing a supply passage 24 for the raw food material, the cover mold 23 being capable of being mounted and removed.

The view of the mold half 22 in FIG. 5 shows its inner mating surface, with the cavity 27 having the shape of the shelled meat of a shrimp. The cavity opening 28 is shaped by the mold into an upwardly extending circular arc approximating the shape of the back of a shrimp. The cover mold 23 (the cover mold can be constructed of plastic or some other material), which is separated in FIGS. 5 and 6, is provided above the mold halves 21 and 22. The cover mold 23 has a concave shape on its lower side to allow it to seal off the cavity opening 28, and it is capable of being freely mounted and removed by being moved up and down. The numeral 24 is the raw material supply passage or channel in the cover mold.

The cover mold 23 is placed onto the top of the mold halves 21 and 22, and the raw material is injected through the channel 24 into the cavity 27. When the injection of the raw material is complete, the cover mold 23 is raised. The mold cavity is filled with the raw material and becomes as shown in FIG. 10.

FIGS. 7 and 8 show the mold halves 21 and 22 and a compression tool 31 which is lowered onto the cavity opening 28. As best shown in FIG. 8, the bottom face of the compression tool 31 has an arcuate projection or edge 32 formed so that it has a wedge-shape in cross section, and it has a concave shape to match the circular arc shape of the cavity opening 28 and the back of a shrimp. This compression tool 31 is preferably also provided with means to allow for moistening of the wedge-shaped projection 7 with water (such as a water tube 17) so that, when the projection 32 presses down on the raw material, the raw material will not stick to it.

FIG. 9 shows the condition of the mold halves 21 and 22 before the injection of a raw material 33. FIG. 10 shows the condition after the injection of the raw material 33. FIG. 11 shows the condition when the compression tool 31 with its wedge-shaped projection 32 is lowered into the cavity opening 28 and forms an arcuate groove 34 in the back of the food product. FIG. 12 shows the condition when the compression tool 31 is raised. FIG. 13 shows the condition when the raw material 33 is solidified by heating; as it solidifies, the raw material expands to form enlarged parts 35 on both sides of the groove 34, and it thereby resembles the shape of the deveined part of a real shrimp. When the halves 21 and 22 are separated after heating, the food product may easily be removed.

Furthermore, because the muscle tissues on a real shrimp are formed symmetrically toward the left and the right, and these block-shaped muscle tissues are connected from the head to the tail, when a real shrimp is cooked, in addition to a lengthwise groove being formed along the deveined part, the enlarged parts of the muscle tissues appear as lateral tiers. In order to form similar lateral tiers in the shrimp-shaped processed food product of this invention, by forming multiple projections at right angles to the wedge-shaped projection, as shown by the projections 36 of FIG. 1, the condition of the muscle tissues at the deveined part can be made to resemble that of a real shrimp.

FIGS. 14 and 15 show another embodiment of this invention. The two-piece split mold 40 formed by halves 41 and 42 is almost identical to the mold halves in FIGS. 5 and 6 at the sides, but, in the vicinity of the cavity opening 43, the cavity 44 widens out somewhat. Although the cover mold 46, for the supply of the raw material, has a concave shape so that it seals off the cavity opening 43, a projection 47 having a wedge-shaped cross section is formed on the arcuate bottom side of the bottom of the cover mold 46 which corresponds to the center of the cavity opening 43. A supply channel 48 is again formed through the cover mold 46.

When the cover mold 46 is pulled away after the injection of the raw material into the cavity 44, the groove 49 from the wedge-shaped projection 47 remains in the top of the raw material in the cavity 44. This condition is similar to that shown in FIG. 11, and when heated, the condition comes to be like that shown in FIG. 13. It is also possible to heat the mold and solidify the raw material without separating the cover mold 46 from the mold halves. Note that, when the cover mold 46 is separated from the mold halves, although not shown in FIGS. 14 and 15, an appropriate moistening means can be used to facilitate separation of the raw material from the mold.

In the production of a shrimp-shaped processed food product through the injection of a raw material for which ground fish meat is used as the main ingredient into mold cavities and the subsequent heating and solidifying of this raw material in the molds, it has heretofore been difficult to produce such a product in the shape of the shelled meat of a real shrimp which has been deveined and cooked. With this invention, through a special design for the shape of the mold, it is possible to form the deveined part on the back of the shrimp, thus providing a product which more closely resembles a real shrimp. The processed food product obtained using this invention is extremely well suited for use in appetizers, deep frying, etc.

What is claimed is:

1. A process for making a food product, comprising the steps of
   1. combining edible material including ground fish meat;
   2. molding said material to the shape of the torso of a shrimp;
   3. cutting a continuous groove along the back of said torso and forming ridges on both sides of said groove; and
   4. heating and solidifying said torso and swelling said ridges to cause said ridges to extend outwardly from said groove.

2. A process as set forth in claim 1, and further including the step, between steps 3 and 4, of forming scallops on said ridges.

3. A processed food product produced by the process set forth in claim 1.

4. A processed food product produced by the process set forth in claim 2.

* * * * *